United States Patent

Boinowitz et al.

Patent Number: 6,117,963
Date of Patent: Sep. 12, 2000

[54] TETRAHYDROFURAN-CONTAINING SILICONE POLYETHERS

[75] Inventors: Tammo Boinowitz; Georg Burkhart, both of Essen; Rolf-Dieter Langenhagen, Hattingen; Andreas Weier, Essen, all of Germany

[73] Assignee: TH Goldschmidt AG, Essen, Germany

[21] Appl. No.: 08/869,551

[22] Filed: Jun. 5, 1997

[30] Foreign Application Priority Data

Mar. 26, 1997 [DE] Germany .............. 197 12 629

[51] Int. Cl.$^7$ .............. C08G 77/06; C08G 77/14
[52] U.S. Cl. .............. 528/25; 528/15; 528/26; 521/86; 521/112
[58] Field of Search .............. 528/15, 26, 25; 521/86, 112

[56] References Cited

U.S. PATENT DOCUMENTS

| | | | |
|---|---|---|---|
| 3,402,192 | 9/1968 | Hulaska | 556/437 |
| 5,306,737 | 4/1994 | Burkhart et al. | 521/112 |
| 5,357,018 | 10/1994 | Burkhart et al. | 528/15 |
| 5,789,454 | 8/1998 | McVey | 521/112 |

OTHER PUBLICATIONS

Hack's Chemical Dictionary, Fourth Edition, 1969, p. 118.

*Primary Examiner*—Robert Dawson
*Assistant Examiner*—Jeffrey B. Robertson
*Attorney, Agent, or Firm*—Frommer Lawrence Haug LLP

[57] ABSTRACT

Block copolymers of the general average formula

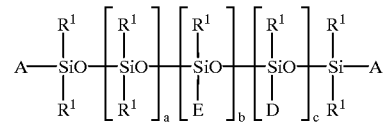

where,
A=radical $R^1$, radical D, or radical E,
D=radical of the formula

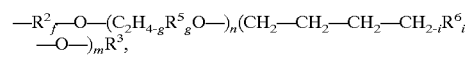

and E is
a) a radical of the general formula $-R^2{}_f-O-(C_2H_{4-g}R^5{}_gO-)_nR^3$ and/or
b) an epoxy-functionalized alkyl substituent which may contain heteroatoms and/or
c) a monohydroxylalkyl, dihydroxylalkyl, or trihydroxyalkyl substituent which may also be aromatic or branched and partially or fully etherfied or esterfied and/or
d) a halogen- or pseudohalogen-substituted alkyl, aryl, or aralkyl radical which may also be branched,
provided that there are two or more different polyether copolymer units in the block copolymer, the remaining variables being defined herein, are disclosed, as well as their use as surface-active substances, in particular as additives in the production of polyurethane foams.

5 Claims, No Drawings

TETRAHYDROFURAN-CONTAINING SILICONE POLYETHERS

The invention relates to polysiloxane-polyether block copolymers and the use as surface-active substances.

Polyoxyalkylene-polysiloxane block copolymers (hereinafter referred to as polyether siloxanes) have found a wide range of applications. Such substances are used as surfactants, emulsifiers, dispersants, paint leveling additives, lubricants, antifoams, as auxiliaries in tertiary petroleum recovery, as foam stabilizers in foaming of polyurethane, as textile auxiliaries for brightening fibers, yarns or sheet-like textile products and for making sanitary products of cellulose fibers hydrophilic and also for many other purposes. Such polyether siloxanes can be used in such a wide variety of ways since their properties, in particular their hydrophile/hydrophobe balance, can be influenced and set to a desired optimum value by appropriate selection of the siloxane block (or the siloxane blocks in the case of mixed compounds). Thus, the siloxane block can be linear or branched, with the absolute number of the difunctional and trifunctional siloxy units and their numerical ratio to one another being able to fluctuate within wide limits.

Predictions as to the effectiveness of polysiloxane-polyoxyalkylene block copolymers as surface-active substances depend very much on the different applications and can, for example for use as foam stabilizer, be made only to a very limited extent. Those skilled in the art therefore need to test the possible variations largely empirically. In view of the large, almost incalculable number of possible variations, the development of appropriate block copolymers is an advance in the art and thus an inventive step.

It is also possible to bind other modifying groups apart from the polyether blocks to a silicon atom. Examples of such radicals are long-chain hydrocarbons having up to 30 carbon atoms, hydrocarbon radicals substituted by halogen atoms, cyano groups or polar radicals, hydroxyl groups, etc.

Thus, GB-B-2 173 510 relates to a process for defoaming diesel fuel or jetfuel in which an antifoam based on a silicone polyether copolymer having a high ethylene oxide content is added to the fuel. In addition, in the fuel industry additive packages are also added to the raw diesel oil to improve its properties. Additive packages are mixtures of various additives such as agents for improving the combustion behavior, agents for reducing smoke formation, agents for reducing the formation of harmful exhaust gases, inhibitors for reducing the corrosion in the engine and its components and quite generally surface-active substances, lubricants and the like. Such additive packages are described, for example, in GB-A-2 248 068 and in the journal Mineralöltechnik 37 (4), pp. 20 ff.

Polysiloxane-polyoxyalkylene block copolymers having different polyoxyalkylene radicals in the average molecule have already described repeatedly. Among the large number of corresponding publications, the following documents may be mentioned by way of example:

In DE-A-44 07 189, it is shown, for example, that such polysiloxane-polyoxyalkylene block copolymers having different polyoxyalkylene radicals and also hydrocarbon substituents having from 6 to 30 carbon atoms on the siloxane are employed as additives for hair cosmetics, in particular for hair shampoos, to improve the feel and the combability of the hair.

DE-A-40 11 942 describes polysiloxane-polyoxyalkylene block copolymers containing polyester groups obtained by ring-opening polymerization and having a mean molecular weight of from 200 to 100,000 in the polyether side chains, which block copolymers are employed as coating agents and for the application of paints.

DE-C-43 43 185 describes the use of silicone-polyether copolymers having high proportions of oxypropylene groups as components of defoamer emulsions based on organofunctionally modified polysiloxanes.

According to DE-C-16 94 366, use is made as foam stabilizers of those polysiloxane-polyoxyalkylene block copolymers whose polysiloxane block is built up in a manner known per se but whose polyoxyalkylene block comprises from 25 to 70% by weight of a polyoxyalkylene having an average molecular weight of from 1600 to 4000 and an ethylene oxide content of from 20 to 100% by weight, remainder propylene oxide and possibly higher alkylene oxides, and from 30 to 75% by weight of a polyoxyalkylene having an average molecular weight of from 400 to 1200 and an ethylene oxide content of from 65 to 100% by weight, remainder propylene oxide and possibly higher alkylene oxides.

DE-A-25 41 865 describes the polyoxyalkylene blocks of the polysiloxane-polyoxyalkylene block copolymers such that one polyoxyalkylene block has a mean molecular weight of from 900 to 1300 and comprises from 30 to 55% by weight of ethylene oxide, remainder propylene oxide, and the other polyoxyalkylene block has a mean molecular weight of from 3800 to 5000 and comprises from 30 to 50% by weight of ethylene oxide, remainder propylene oxide.

The block copolymer described in EP-A-0 275 563 comprises three different polyoxyalkylene blocks, namely a block containing from 20 to 60% by weight of oxyethylene units and having a molecular weight of from 3000 to 5500, a further block containing from 20 to 60% by weight of oxyethylene units and having a molecular weight of from 800 to 2900 and a third block consisting only of polyoxypropylene units and having a molecular weight of from 130 to 1200.

In U.S. Pat. No. 5,357,018 too, it is shown that it is possible to combine very different polyether blocks in the same molecule. Each polyoxyalkylene block can be composed of different oxyalkylene units, primarily oxyethylene, oxypropylene and oxybutylene units.

Also important is the end group of the polyoxyalkylene block which can be reactive (e.g. OH group) or inert (e.g. alkoxy group). In DE-C-15 70 647, chloropolysiloxanyl sulfates are reacted with mixtures of alkylene oxide adducts which comprise from 50 to 95 OH-equivalent percent of polyalkylene glycol monoethers which comprise ethylene oxide and propylene oxide units, contain from 40 to 70% by weight of oxypropylene units and have a molecular weight of from 1000 to 3000 and whose hydroxyl groups are preferably secondary, and from 5 to 50 OH-equivalent percent of alkylene oxide adducts of polyfunctional hydroxyl compounds which have a molecular weight of from 130 to 3500 and whose polyalkylene glycol components comprise ethylene oxide and/or propylene oxide units and have an OH-equivalent weight of up to 1750 and whose hydroxyl groups are preferably secondary, with the ratios being selected such that at most 1.4, preferably from 1.05 to 1.2, OH-equivalents are employed per acid equivalent of the chloropolysiloxanyl sulfate. Such polyether siloxanes can, according to the prior art, be prepared in various ways. Thus, for example, according to DE-C-10 12 602 polyether monoalcohols or diols can be reacted in the presence of a solvent and a catalyst with polysiloxanes which have terminal SiO-alkyl groups, with the aliphatic alcohol liberated being distilled from the reaction mixture. This is thus a transesterification. The reaction of OH-containing polyethers (polyether monoalcohols) with equilibrated siloxane mixtures of the general formula $R_xSiO_y(SO_4)_zX_{4-(z+x+2y)}$ (R=any monovalent hydrocarbon radical; X=halogens or alkoxy radicals; x=0.9–2.2; y=0.75–1.75; z=0.001–0.5; 4>(z+x+2y)>2) is also known. The acids liberated in the reaction are neutralized, the reaction product is filtered and freed of solvent. Such a procedure is described, for example, in DE-C-17 95 557. Both processes give polyether siloxanes in which the polyether group(s) is (are) connected to the siloxane framework via an SiOC bridge.

The preparation of Si—C-bonded silicone polyether copolymers by hydrosilylation using a wide variety of catalyst systems has also long been known. However, it has been found that despite the many structural parameters which can be varied (chain length of the siloxane, number and position of the polyalkylene oxide copolymer units, length of the polyalkylene oxide copolymers used, their end groups and also, in particular, the groups introduced by lateral substituents on the —$(C_2H_3RO)_n$— chain of the polymers made up of ethylene oxide, propylene oxide and possibly butylene oxide), many technical problems have not been solved optimally. In this context, it is interesting that the silicone polyether copolymers of the prior art which are used generally comprise uniformly built-up polymer chains as backbone. By this is meant the fact that the structures are built up of similar building blocks such as unsubstituted or substituted epoxides. As a result, although ethylene oxide, propylene oxide, butylene oxide and also epoxides of longer-chain olefins are used, the base structure of the property-determining polyether chain is in all these cases the regular succession of an oxygen atom and two carbon atoms along the chain.

The number and length of the lateral substituents on the polyether backbone (use of propylene oxide or butylene oxide) then influences properties such as the surface tension of a mixture with a foaming polyol. Despite this, the demands made of the property profile of polyurethane foams have not yet all been met.

Thus, for example, in the course of the further development of foaming technologies in the production of flexible polyurethane foams, the use of gases liquefied under pressure as blowing agents, for example, has shown that demands made of the fine-celled nature of the resulting foams, as achieved, for example, in U.S. Pat. No. 5,306,737 by increased proportions of propylene oxide in the polyalkylene oxide copolymer units used, increase in importance.

It is an object of the present invention to find substances having surfactant properties which effect a particularly good compatibilization between different polar constituents of a mixture or reaction formulation.

It has now surprisingly been found that this object is achieved by use of silicone polyether copolymers whose polyether copolymer unit is composed entirely or partially of unsubstituted or substituted $(C_2H_3RO)$ and $(C_4H_7RO)$ building blocks. Here, the polyether build-up principle of a regular succession of similar structural units (according to the prior art normally C—C—O units in the case of stabilizers) is expressly broken. This is achieved by the use of different "backbone units" —(C—C—O)— and —(C—C—C—C—O)— as constituent of the polyether backbone. Such polyethers as copolymers comprising epoxides and tetrahydrofuran structures are also, in contrast to the pure epoxide polyethers, prepared not by base-catalyzed polymerization but under acid conditions.

It is found that the use of tetrahydrofuran units in siloxane-polyoxyalkylene copolymers provides an excellent opportunity for matching the properties to the requirements of polyurethane foaming. In these copolymers comprising unsubstituted or alkyl-substituted ethylene oxide and unsubstituted or substituted tetrahydrofuran building blocks, it is surprisingly possible to produce very fine-celled and nevertheless stable polyurethane foams. Even small amounts, compared with the total molecular weight of the silicone-polyether copolymer, of polyethers containing $(C_4H_7RO)$ groups have astonishingly clear effects.

The invention accordingly provides block copolymers of the general average formula:

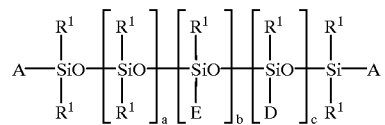

where
A=radical $R^1$, radical D or radical E,
$R^1$=alkyl radical having from 1 to 30 carbon atoms, substituted alkyl radical, unsubstituted or substituted aryl radical or unsubstituted or substituted alkaryl radical, but with at least 80% of the radicals $R^1$ being methyl groups,
D=radical of the formula

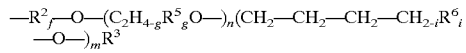

where
$R^2$ is a divalent alkylene radical which may also be branched,
f is 0 or 1,
g is from 0 to 3,
i is 0 or 1,
m is from 1 to 30,
n is from 0 to 100 and
$R^3$ is hydrogen, an unsubstituted or substituted alkyl radical having from 1 to 6 carbon atoms, an acyl radical or a —O—CO—NH—$R^4$ radical in which $R^4$ is an unsubstituted or substituted alkyl or aryl radical,
$R^5$ is a monovalent organic radical which may also be branched or contain ether groups
$R^6$ is an alkyl radical having 1 to 6 carbon atoms,
where at least one radical D has to be present in the average molecule, possibly in the form of the radical A,
a is from 3 to 200,
b is from 0 to 50 and
c is from 0 to 50,
E is
a) a radical of the general formula

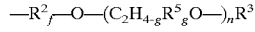

and/or
b) an epoxy-functionalized alkyl substituent which may contain heteroatoms and/or
c) a monohydroxyalkyl, dihydroxyalkyl or trihydroxyalkyl substituent which may also be aromatic or branched and partially or fully etherified or esterified, and/or
d) a halogen- or pseudohalogen-substituted alkyl, aryl or aralkyl radical which may also be branched.

Examples of the radical E as defined above are addition products of allyl glycidyl ether, trimethylolpropane monoallyl ether or allyl chloride.

It is here also possible to use various substituents in combination, as described for example for polyether substituents in DE-C-42 29 402. The substituents may also differ, for example, in their molar mass, in the case of polyethers possibly in their end group $R^3$ or the proportions of the monomers used, the type of monomers, etc.

Silicone polyether copolymers which have been found to be particularly suitable are those which are obtained by combinations of two or more different polyether copolymer units with one or more silicone polymers. The differentiation in the case of the polyether copolymers can be either a difference in the relative proportions of the building blocks used for the preparation of this copolymer or be a difference in the molecular weight of the total polyether chain, as well as in its functionality. Various siloxane copolymers can be distinguished either by their molar mass and also their degree of branching or the number or relative positions of the reactive groups available for forming a linkage. The linkage of the corresponding silicones with the polyoxyalkylene copolymers to be used can be carried out either by hydrosilylation of unsaturated polyether copolymers or by reaction with hydroxy-functional polyoxyalkylene copolymers to form SiOC links.

To demonstrate the build-up principle of the compounds claimed, the following siloxane/polyether combinations are, by way of example, reacted according to literature methods:

Si 1) $(CH_3)_3SiO—[(CH_3)_2SiO—]_{58}[(CH_3)HSiO—]_6Si(CH_3)_3$

Si 2) $(CH_3)_3SiO—[(CH_3)_2SiO—]_{120}[(CH_3)HSiO—]_{10}Si(CH_3)_3$

Si 3) $(CH_3)_3SiO—[(CH_3)_2SiO—]^5[(CH_3)HSiO—]_5Si(CH_3)_3$

Si 4) $(CH_3)_3SiO—[(CH_3)_2SiO—]_{20}[(CH_3)HSiO—]_5Si(CH_3)_3$

Si 5) $(CH_3)_2HSiO—[(CH_3)_2SiO—]^{58}[(CH_3)HSiO—]_6SiH(CH_3)_2$

Si 6) $(CH_3)_3SiO—[(CH_3)_2SiO—]_{58}[(CH_3)HSiO—]_{20}Si(CH_3)_3$

Si 7) $(CH_3)_2HSiO—[(CH_3)_2SiO—]_{58}SiH(CH_3)_2$

PE a) $CH_2=CH—CH_2O—(C_2H_4—)_{16}(C_3H_6O—)_{12}CH_3$, residual OH number<2

PE b) $CH_2=CH—CH_2O—(C_2H_4O—)_{45}(C_3H_6O—)_{34}CH_3$, residual OH number<5

PE c) $CH_2=CH—CH_2O—(C_2H_4O—)_5(C_4H_8O—)_9CH_3$, residual OH number<2

PE d) $CH_2=CH—CH_2O—(C_2H_4O—)_4(C_3H_6O—)_{10}(C_4H_8O—)_9CH_3$, residual OH number<3

PE e) $CH_2=CH—CH_2O—(C_2H_4O—)_5(C_3H_6O—)_{21}CH_3$, residual OH number<2

PE f) $CH_2=CH—CH_2O—(C_2H_4O—)_{45}(C_3H_6O—)_{34}H$

PE g) $CH_2=CH—CH_2O—(C_2H_4O—)_5(C_4H_8O—)_9COCH_3$, residual OH number<2

PE h) $CH_2=CH—CH_2O—(C_2H_4O—)_9(C_4H_8O—)_9CH_3$, residual OH number<3

PE i) $CH_2=CH—CH_2O—(C_3H_6O—)_{10}(C_4H_8O—)_9CH_3$, residual OH number<3

PE k) $CH_2=CH—CH_2O—(C_2H_4O—)_{15}COCH_3$, residual OH number<2

PE l) $CH_2=CH—CH_2O—(C_2H_4O—)_{15}H$

Reaction according to the following table gives the silicone-polyether copolymers described.

| Example | Siloxane | PE 1 (eq %) | PE 2 (eq %) | PE 3 (eq %) | PE 4 (eq %) |
|---|---|---|---|---|---|
| 1 (−) | 1 | a (65) | b (35) | | |
| 2 (+) | 1 | a (40) | b (35) | c (25) | |
| 3 (+) | 1 | a (55) | b (35) | c (10) | |
| 4 (+) | 1 | a (40) | b (35) | d (25) | |
| 5 (−) | 1 | a (30) | e (35) | f (35) | |
| 6 (+) | 1 | a (20) | c (10) | e (35) | f (35) |
| 7 (+) | 2 | a (40) | b (35) | d (25) | |
| 8 (+) | 3 | g (45) | f (55) | | |
| 9 (+) | 4 | h (20) | b (40) | k (40) | |
| 10 (+) | 5 | i (25) | k (25) | a (50) | |
| 11 (+) | 5 | a (40) | b (35) | c (25) | |
| 12 (+) | 6 | c (70) | k (30) | | |
| 13 (+) | 7 | i (50) | l (50) | | |

In this table, examples according to the invention are denoted by a (+) after the example number, while comparative products which are not according to the invention are marked by (−).

The preparation of the compounds is carried out by generally customary preparation methods, e.g. according to the following procedure: the siloxanes, polyethers and if appropriate solvents are placed in a flask fitted with stirrer, thermometer, gas inlet and reflux condenser. Nitrogen is passed through the apparatus and the contents are heated to 105° C. while stirring. At 105° C., the initial charge is admixed with a 10% strength solution of $H_2PtCl_6.6H_2O$ in i-propanol (about 0.6 g per 1000 g of mixture). An exothermic reactional occurs. This results, depending on the starting materials, in temperature increases of from 10 to 30° C. The mixtures are allowed to finish reacting and SiH conversions of >97% (determined via hydrogen which can be liberated using n-butanol in alkaline medium) are achieved. The initially turbid contents of the flask become clear during the reaction. The reaction times are generally from 1 to 8 hours. The polyethers are used in excess (35%). As solvents, it is possible to use those which can be. distilled off after the reaction (e.g. toluene, xylene) or those which can remain in the end product after the reaction (e.g. dipropylene glycol, dipropylene and tripropylene glycol mono-n-butyl ether, polyethers which are free of double bonds).

To demonstrate the property changes of the tetrahydrofuran-polyether-containing silicone-polyether copolymers of the invention compared with comparative products which are not according to the invention, the products can be tested, for example, as foam stabilizers in a polyurethane formulation. In Examples 2 to 4 and 6 according to the invention, part of the EO/PO polyether from Comparative Example 1 or 5 is, by way of example, in each case replaced by the THF-epoxide copolymers (THF-containing polyethers) on which the invention is based. Both different amounts of THF-containing polyethers and polyethers having differing THF contents are used here.

The test formulation is based on 100 parts of a polyol. (OHN=46, 11% of EO), 5 parts by weight of water, 0.15 parts by weight of tertiary amine, 0.23 parts by weight of tin octoate, 5 parts by weight of a physical blowing agent, 63.04 parts by weight of toluene diisocyanate T80 and 0.5 or 0.6 parts by weight of the copolymer to be tested. Foaming is carried out using 300 g of polyol and the other formulation constituents are scaled accordingly.

To test the additive as stabilizer, polyol, water, amine, tin octoate, stabilizer and blowing agent are mixed while stirring well. After addition of the isocyanate, the mixture is stirred for 7 seconds at 3000 rpm and is poured into a paper-lined wooden box (base area 27 cm×27 cm). To test the additive in respect of other properties, e.g. as cell regulator or for improving the air permeability of the foam, it is naturally also possible to make concomitant use of another stabilizer. The result is a foam on which the following data are measured to evaluate the additive used:
1. The settling of the foam at the end of the rise phase (indicated as settling in the following table).
2. The number of cells per centimeter of foam is counted under a microscope.
3. The air permeability of the foam is determined by a pressure build-up measurement on the foam. The measured pressure build-up is given in mm of water, with the lower pressure build-up values then characterizing the more open foam.

The following use-related parameters were determined; in each case the values when using 0.6/0.5 parts by weight of the copolymer are indicated:

| Example | Settling [cm] | Pressure build-up [mm] | Cells per cm |
|---|---|---|---|
| 1 (−) | 0/0 | 34/39 | 13/13 |
| 2 (+) | 0/0 | 32/36 | 15/14 |
| 3 (+) | 0/0 | 37/30 | 14/14 |
| 4 (+) | 0/0 | 40/31 | 13/14 |
| 5 (−) | 0/0 | 46/46 | 14/14 |
| 6 (+) | 0/0 | 22/23 | 14/14 |

Comparison of the compounds 2, 3 and 4 according to the invention with the comparative product 1 demonstrates the improvement in the cell fineness achieved using the THF-epoxide copolymers as constituents of silicone-polyether copolymers. Particularly noteworthy is the fact that with virtually unchanged air permeability of the resulting foams, no reduction in the foam yield is observed despite the improved cell fineness. As comparison of Examples 5 and 6 shows, use of the compounds of the invention also makes it possible to produce foam with improved air flows without reduction of the foam stability or the cell fineness.

What is claimed is:

1. A block copolymer of the general average formula

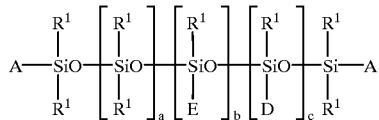

where

A=radical $R^1$, radical D or radical E, $R^1$=alkyl radical having from 1 to 30 carbon atoms, substituted alkyl radical, unsubstituted or substituted aryl radical or unsubstituted or substituted alkaryl radical, but with at least 80% of the radicals $R^1$ being methyl groups, D=radical of the formula

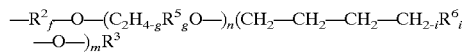

where $R^2$ is a divalent alkylene radical which may also be branched, f is 0 or 1, g is from 0 to 3, i is 0 or 1, m is from 1 to 30, n is from 0 to 100 and $R^3$ is hydrogen, an unsubstituted or substituted alkyl radical having from 1 to 6 carbon atoms, an acyl radical or a —O—CO—NH—$R^4$ radical in which $R^4$ is an unsubstituted or substituted alkyl or aryl radical, $R^5$ is a monovalent organic radical which may also be branched or contain ether groups, $R^6$ is an alkyl radical having 1 to 6 carbon atoms, where at least one radical D has to be present in the average molecule, a is from 3 to 200, b is from 0 to 50, and c is from 0 to 50, E is a) a radical of the general formula

and/or b) an epoxy-functionalized alkyl substituent which may contain heteroatoms and/or c) a monohydroxyalkyl, dihydroxyalkyl or trihydroxyalkyl substituent which may also be aromatic or branched and partially or fully etherified or esterified, and/or d) a halogen- or pseudohalogen-substituted alkyl, aryl or aralkyl radical which may also be branched, provided that there are two or more different polyether copolymer units in the block copolymer.

2. The block copolymer according to claim 1 wherein at least one radical D is present in the average molecule and it is present in the form of the radical A.

3. The block copolymer according to claim 1, wherein $R^3$ is a —O—CO—NH—$R^4$ radical in which $R^4$ is an unsubstituted or substituted alkyl or aryl radical.

4. In a method for producing polyurethane foams the improvement which comprises adding a block copolymer according to claim 1 as an additive.

5. A method for reducing the surface tension in water or water solutions or reducing the interfacial tension between two liquids or between a liquid and a solid which comprises adding a block copolymer according to claim 1 to said water or water solution, said liquids or said liquids and a solid.

* * * * *